(12) United States Patent
Huang et al.

(10) Patent No.: US 9,158,312 B2
(45) Date of Patent: Oct. 13, 2015

(54) METHOD AND DEVICE FOR CONTROLLING OUTLET WATER TEMPERATURE OF WATER HEATER

(75) Inventors: Chung-Chin Huang, Taichung (TW); Chin-Ying Huang, Taichung (TW); Hsin-Ming Huang, Taichung (TW); Hsing-Hsiung Huang, Taichung (TW); Kuan-Chou Lin, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 1023 days.

(21) Appl. No.: 12/831,537

(22) Filed: Jul. 7, 2010

(65) Prior Publication Data

US 2012/0006527 A1    Jan. 12, 2012

(51) Int. Cl.
*F24H 1/10*    (2006.01)
*G05D 23/19*   (2006.01)
*F24H 9/20*    (2006.01)

(52) U.S. Cl.
CPC .......... *G05D 23/1902* (2013.01); *F24H 9/2035* (2013.01); *F24D 2220/042* (2013.01); *F24D 2220/044* (2013.01)

(58) Field of Classification Search
USPC .............................. 122/13.01, 14.22; 165/295
See application file for complete search history.

(56) References Cited

U.S. PATENT DOCUMENTS

| | | | |
|---|---|---|---|
| 4,501,261 A * | 2/1985 | Tsutsui et al. | 122/14.3 |
| 5,322,216 A * | 6/1994 | Wolter et al. | 236/25 R |
| 8,371,252 B1 * | 2/2013 | Paine | 122/448.3 |
| 2010/0195991 A1 * | 8/2010 | Deivasigamani et al. | 392/308 |

* cited by examiner

*Primary Examiner* — Alissa Tompkins
*Assistant Examiner* — John Bargero
(74) *Attorney, Agent, or Firm* — Tracy M. Heims; Apex Juris, Pllc

(57) ABSTRACT

A temperature controlling device includes a setting controller, a gas valve, a burner, an inlet temperature sensor, a water meter, and an operational controller. User sets a desired temperature via the setting controller. The inlet temperature sensor senses an inlet temperature of water at an inlet of a pipe, and then operational controller calculates a difference between the inlet temperature and the desired temperature to get a total heat for heating water in a predetermined heating time and transfer the total heat into a total gas consumption, and controls the gas valve to supply gas to the burner with an amount of the total gas consumption in a predetermined heating time. After that, water should be heated to the desired temperature, and the operational controller controls the gas valve to decrease the gas supply for maintaining water temperature.

3 Claims, 10 Drawing Sheets

METHOD AND DEVICE FOR CONTROLLING OUTLET WATER TEMPERATURE OF WATER HEATER

BACKGROUND OF THE INVENTION

1. Field of the Invention

The present invention relates generally to a water heater, and more particularly to a method for controlling water temperature of outlet water of a water heater and the controlling device thereof.

2. Description of the Related Art

FIG. 1 shows a conventional water heater 500 capable of controlling water temperature. The water heater 500 includes a water pipe 510, a gas pipe 520, and a temperature controller 530. The water pipe 510 has an inlet 511 and an outlet 512. The temperature controller 530 includes a gas controller 531, a burner 532, a temperature sensor 533, and an operational controller 534.

The gas pipe 520 provides gas to the burner 532 that the burner 532 may heat water in the water pipe 510. The gas controller 531 is provided at the gas pipe 520 to adjust a flow rate of gas to the burner 532. The temperature sensor 533 is provided at the outlet 512 of the water pipe 510 to sense an outlet water temperature of the heated water. The sensed temperature is sent to the operational controller 534 that the operational controller 534 may control the gas controller 531 according to the temperature.

A user may set a desired temperature that the operational controller 534 may control the gas controller 531 according to the difference between the outlet water temperature and the desired temperature. The operational controller 534 controls the gas controller 531 to provide more gas when the outlet water temperature is lower than the desired temperature, and the operational controller 534 controls the gas controller 531 to provide less gas when the outlet water temperature is higher than the desired temperature to maintain the desired temperature.

However, such water control method still has the following drawbacks:

As shown in FIG. 2, when the conventional water heater 500 is heating water, the outlet water temperature is lower than the desired temperature at time (a) that the operational controller 534 controls the gas controller 531 to provide the burner 532 more gas to keep the temperature rising. At time (b), the sensed temperature is equal to the desired temperature that the operational controller 534 controls the gas controller 531 to provide the burner 532 less gas. However, the water has been heated before time (b) that the outlet water temperature keeps rising. The outlet water temperature is much higher than the desired temperature at time (c) that the gas controller 531 provides less gas and the operational controller 534 keeps controlling the gas controller 531 to provide lesser gas to drop the temperature. The gas controller 531 is instructed to provide more gas again after time (d), which the outlet water temperature is equal to the desired temperature, but the temperature keeps dropping until time (e). After that the water temperature is kept being adjusted around the desired temperature and becomes steady gradually. In conclusion, the conventional water heater 500 is not an optimum device and needs to be improved.

SUMMARY OF THE INVENTION

The primary objective of the present invention is to provide a method and a device for controlling outlet water temperature in a steady mode.

The secondary objective of the present invention is to provide a method and a device for controlling outlet water temperature, where the temperature is adjusted in several sections to reach the desired temperature in a short time.

According to the objectives of the present invention, a method of controlling an outlet water temperature of a water heater includes setting a desired temperature; sensing an inlet water temperature and a flow rate; calculating the inlet water temperature, the flow rate, and the desired temperature to get a total heat for heating water from the inlet water temperature to the desired temperature in a predetermined heating time; transferring the total heat to a total gas consumption, and then dividing the total gas consumption into a gas supply per unit time; supplying gas to a burner for heating water according to the gas supply per unit time until the gas reaches the total gas consumption; and adjusting gas to the burner for maintaining an outlet water temperature.

A temperature controlling device executed above control method includes a setting controller for manipulation to set a desired temperature and generate a setting signal; a burner for heating water in a pipe; a gas valve to be controlled to adjust gas supplied to the burner; an inlet temperature sensor for sensing an inlet temperature of water at an inlet of the pipe and generating an inlet temperature signal; a water meter for sensing a flow rate of water at the inlet of the pipe and generating a flow rate signal; and an operational controller electrically connecting the setting controller, the gas valve, the inlet temperature sensor and the water meter to receive the setting signal from the setting controller, the inlet temperature signal from the inlet temperature sensor and the flow rate signal from the water meter to control the gas valve according to the setting signal, the inlet temperature signal and the flow rate signal.

DETAILED DESCRIPTION OF THE INVENTION

Figure 3:
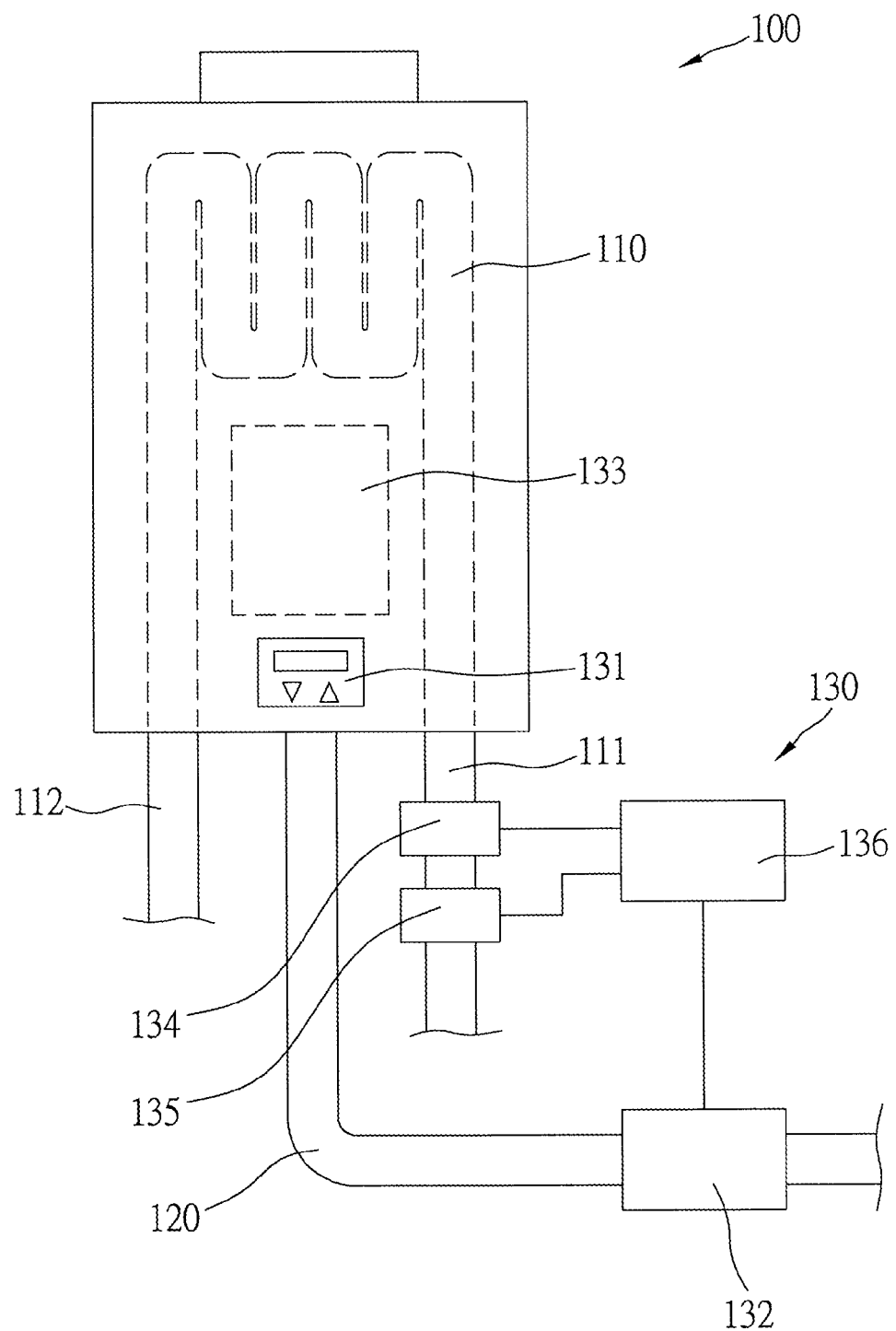
FIG. 3 is a sketch diagram of the temperature controlling device of a first preferred embodiment of the present invention.
Figure 4:
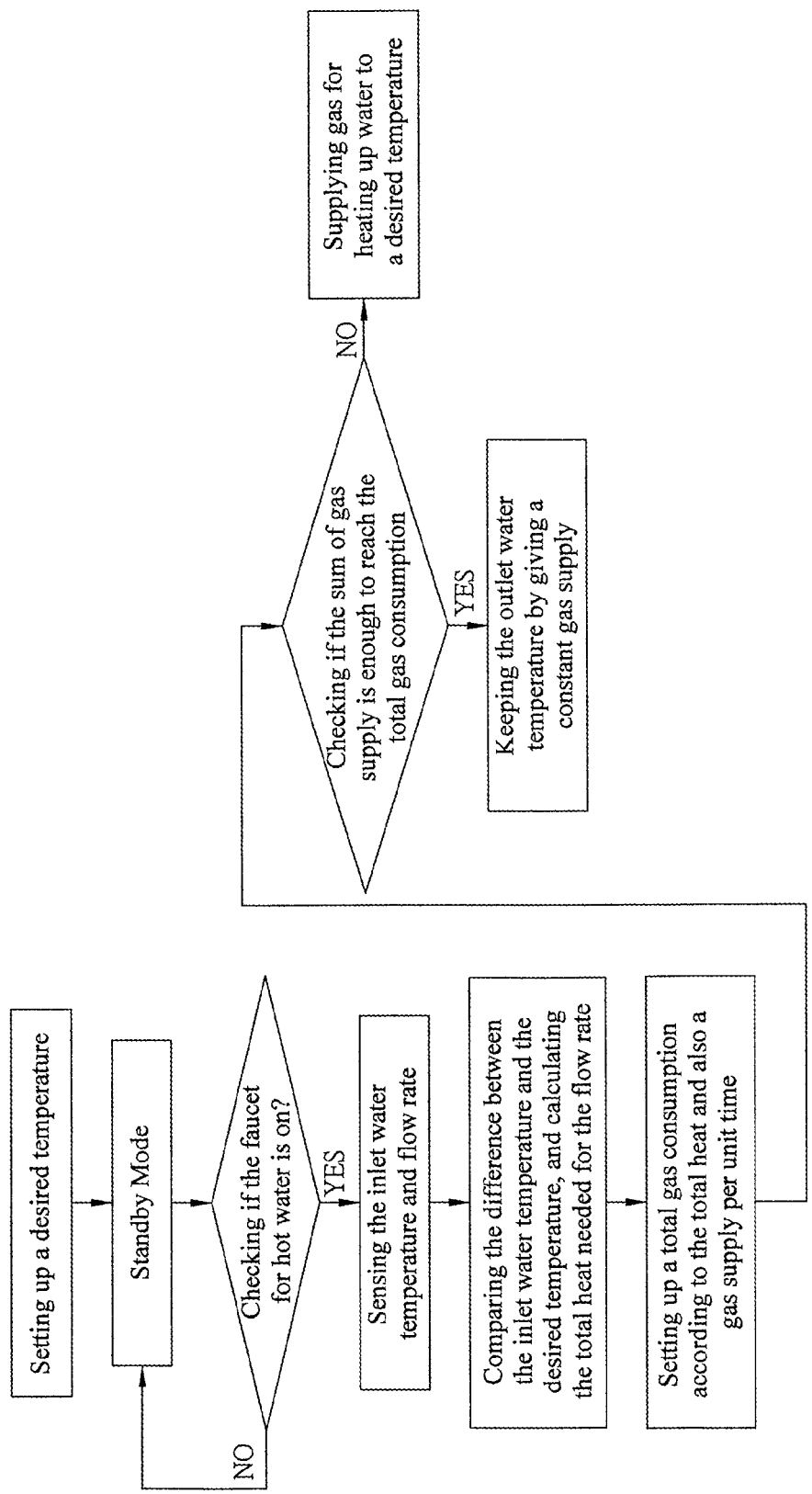
FIG. 4 is a flow chart of the steps of controlling temperature of the first preferred embodiment of the present invention.

FIG. 3 and FIG. 4 show a method and a device for controlling outlet water temperature of the first preferred embodiment of the present invention. A water heater 100 includes a water pipe 110, a gas pipe 120, and a temperature controlling device 130. The water pipe 110 has an inlet 111 and an outlet 112. The temperature controlling device 130 has a setting controller 131, a gas valve 132, a burner 133, an inlet temperature sensor 134, a water meter 135, and an operational controller 136. The method and device for controlling water temperature are described hereunder:

First, a user operates the setting controller 131 to set a desired temperature, and the setting controller 131 transmits a setting signal to the operational controller 136 indicating the desired temperature. The operational controller 136 controls an outlet water temperature according to the desired temperature. After setting, the water heater 100 enters a standby mode.

Locations of the inlet temperature sensor 134 and the water meter 135 are close to the inlet 111 of the water pipe 110 to sense the temperature and flow rate of water at the inlet 111 when a user turns on a faucet (not shown), and then transmits an inlet temperature signal and a flow rate signal to the operational controller 136.

The operational controller 136 compares the setting signal with the inlet temperature signal, calculates to get a total heat for rising the water temperature to the desired temperature in a predetermined heating time, and gets a total gas consumption according to the total heat. The operational controller 136 divides the total gas consumption to get a gas supply per unit time. In the present embodiment, the gas supply per unit time is the total gas consumption divided by the predetermined heating time. That is, the gas supply per unit time is an average gas supply. A sum of the average gas supplies is the total gas consumption.

After calculation, the operational controller 136 sends an adjusting signal to the gas valve 132 to change a flow rate of gas in the gas pipe 120 that the burner 133 may heat the water in the water pipe 110 in a desired condition.

When the gas supply reaches the total gas consumption, it supposes that the water temperature should reach the desired temperature. At this moment, the operational controller 136 adjusts the gas valve 132 automatically that the gas pipe 120 provides the burner 133 a constant amount of gas to maintain the water temperature.

An equation for calculating the total heat is a specific heat of water times a flow rate sensed by the water meter 135, times a difference between the water temperature sensed by the inlet temperature sensor 134 and the desired temperature set by the setting controller 131, and then times a predetermined time. The equation is:

$$\text{specific heat of water}*(\text{desired temperature}-\text{water temperature})*\text{predetermined time}=\text{total heat}$$

Figure 1:
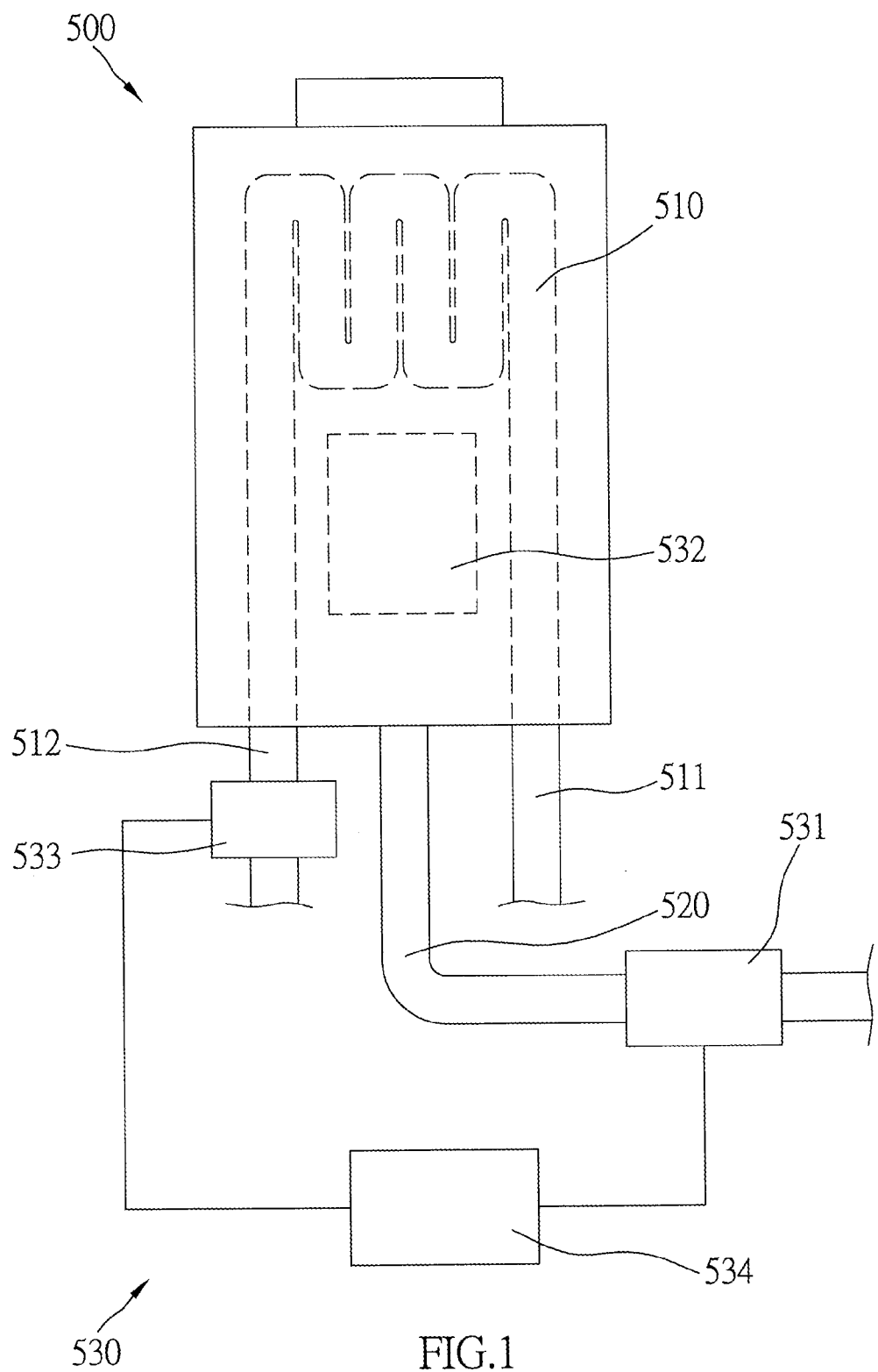
FIG. 1 is a sketch diagram of the conventional temperature-controlled water heater.
Figure 2:
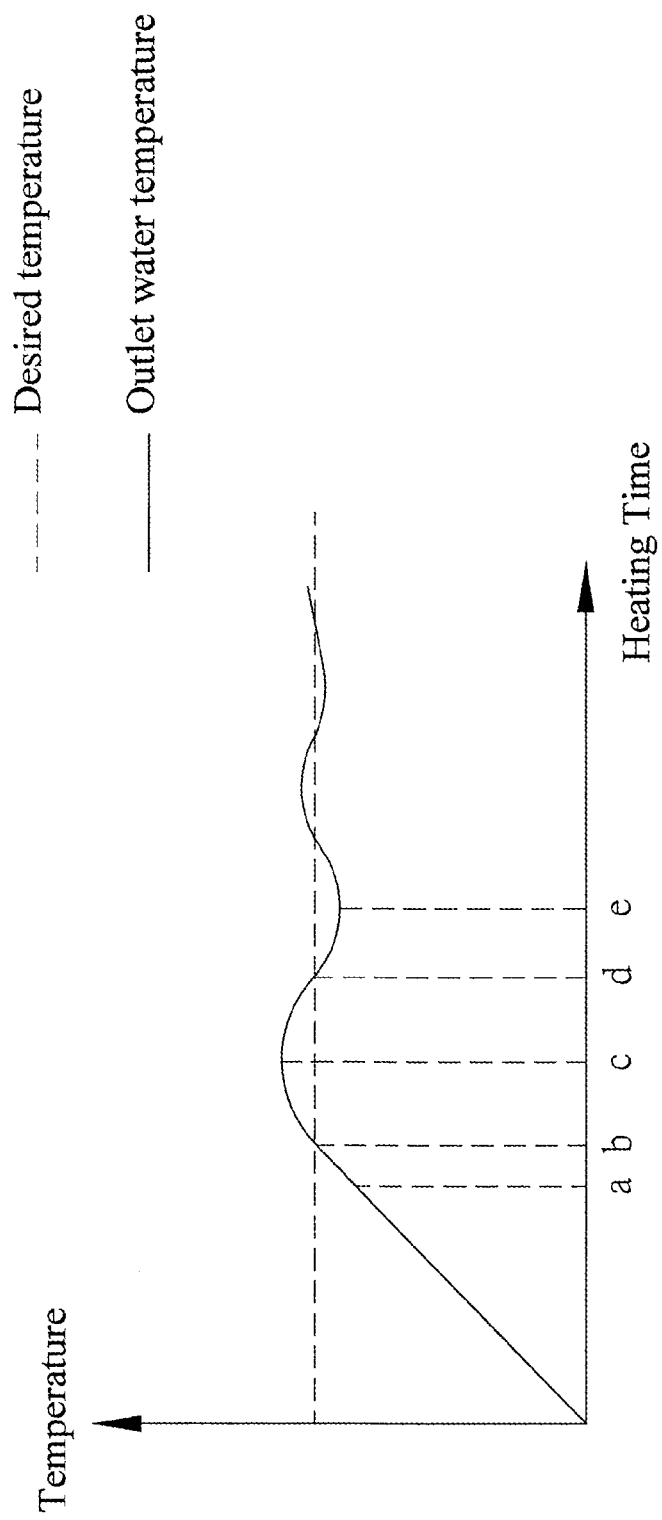
FIG. 2 is a curve diagram of the temperature change of the conventional temperature-controlled water heater.
Figure 5:
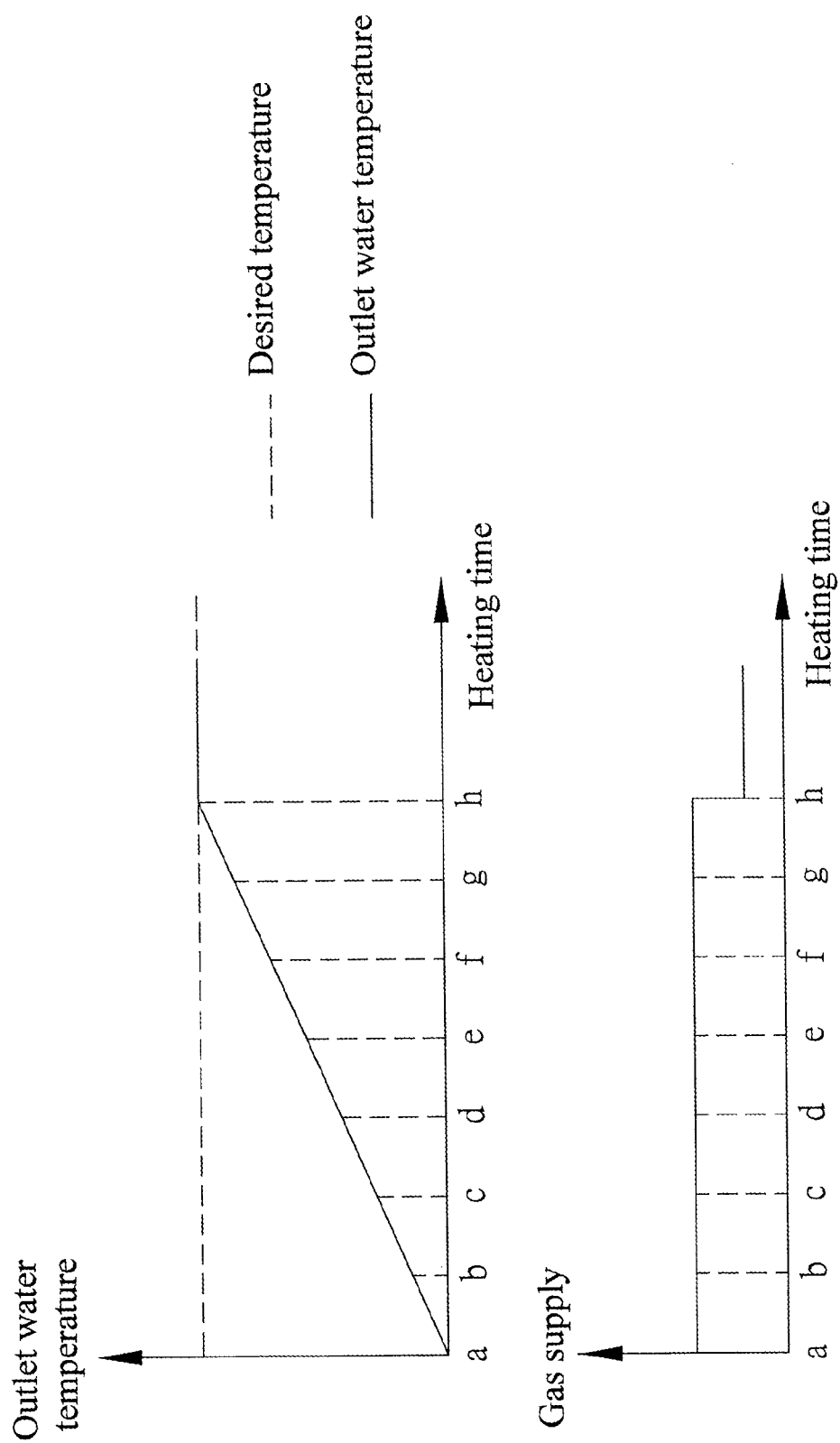
FIG. 5 is a curve diagram of the relationship of the outlet water temperature and the gas supply of the first preferred embodiment of the present invention.

FIG. 5 is a curve diagram of the water temperature and gas supply of the temperature controlling device 130 of the present invention. We divide the time into several periods from time (a) to time (h). In the present embodiment, the gas supply (the average supply) is constant from time (a) to time (h) that the water temperature rises linearly. The gas supply reaches the total gas consumption at time (h) which means the water temperature is risen to the desired temperature. At this moment, the operational controller 136 adjusts the gas valve 132 to decrease the gas supply for maintaining the water temperature. Compare with FIG. 2, it is easy to understand that the present invention overcomes the drawback of the conventional water heater which takes a long time to reach the desired temperature. The present invention takes shorter time to reach the desired temperature and has little temperature variation.

Except for the first preferred embodiment, we may provide another sensor to sense the outlet water temperature that it may control water temperature more precisely.

Figure 6:
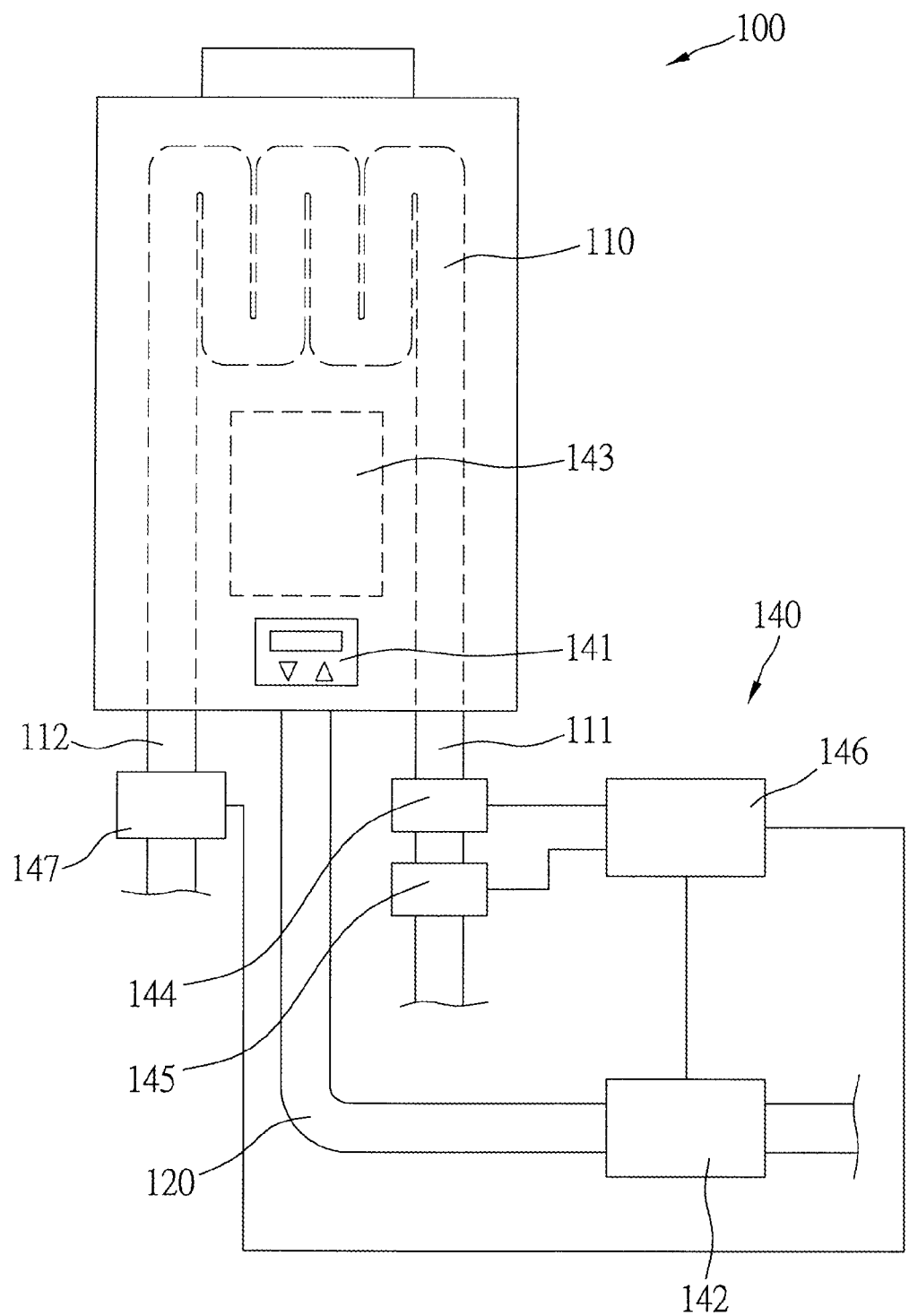
FIG. 6 a sketch diagram of the temperature controlling device of a second preferred embodiment of the present invention.
Figure 7:
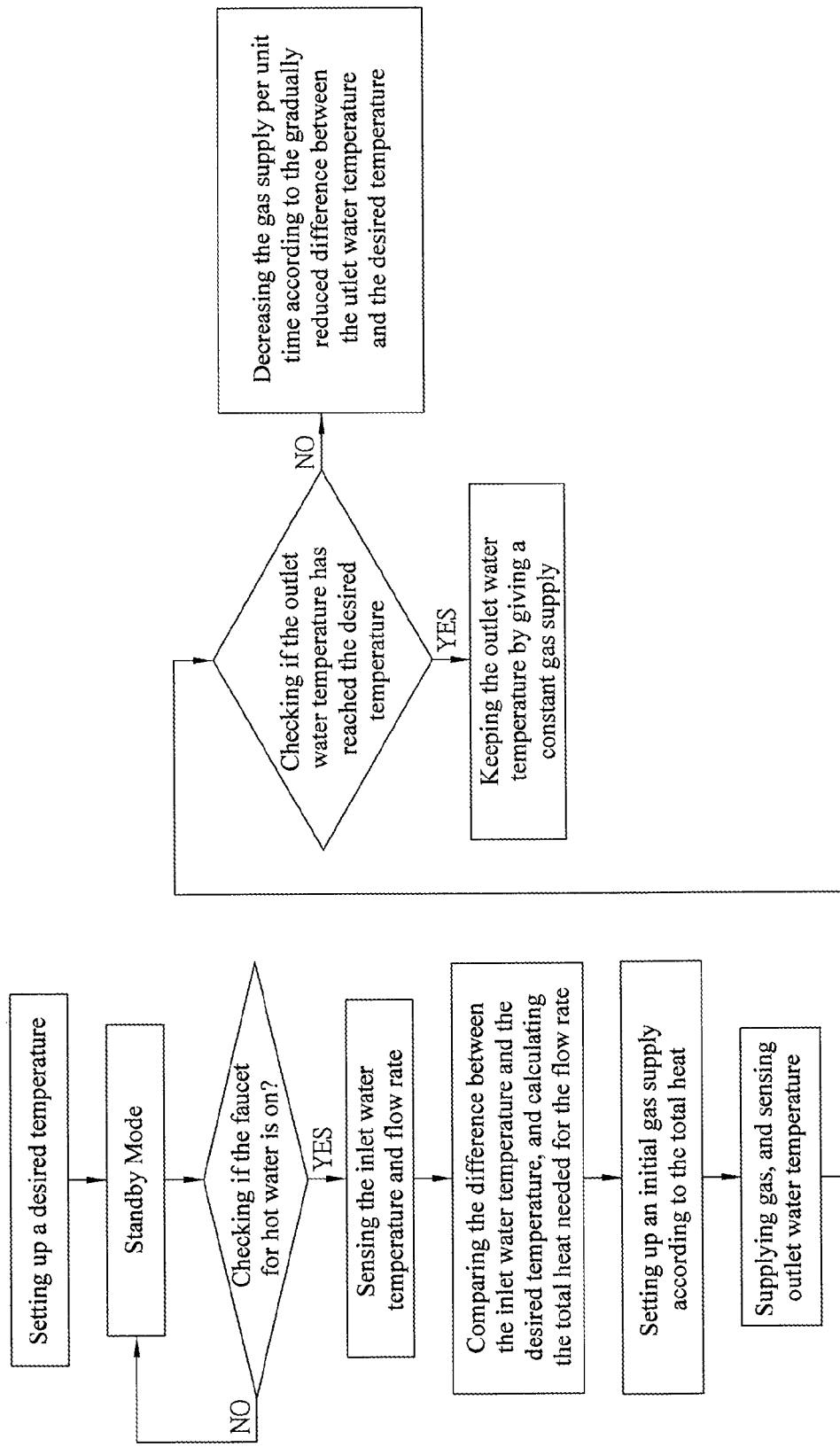
FIG. 7 is a flow chart of the steps of controlling temperature of the second preferred embodiment of the present invention.
Figure 8:
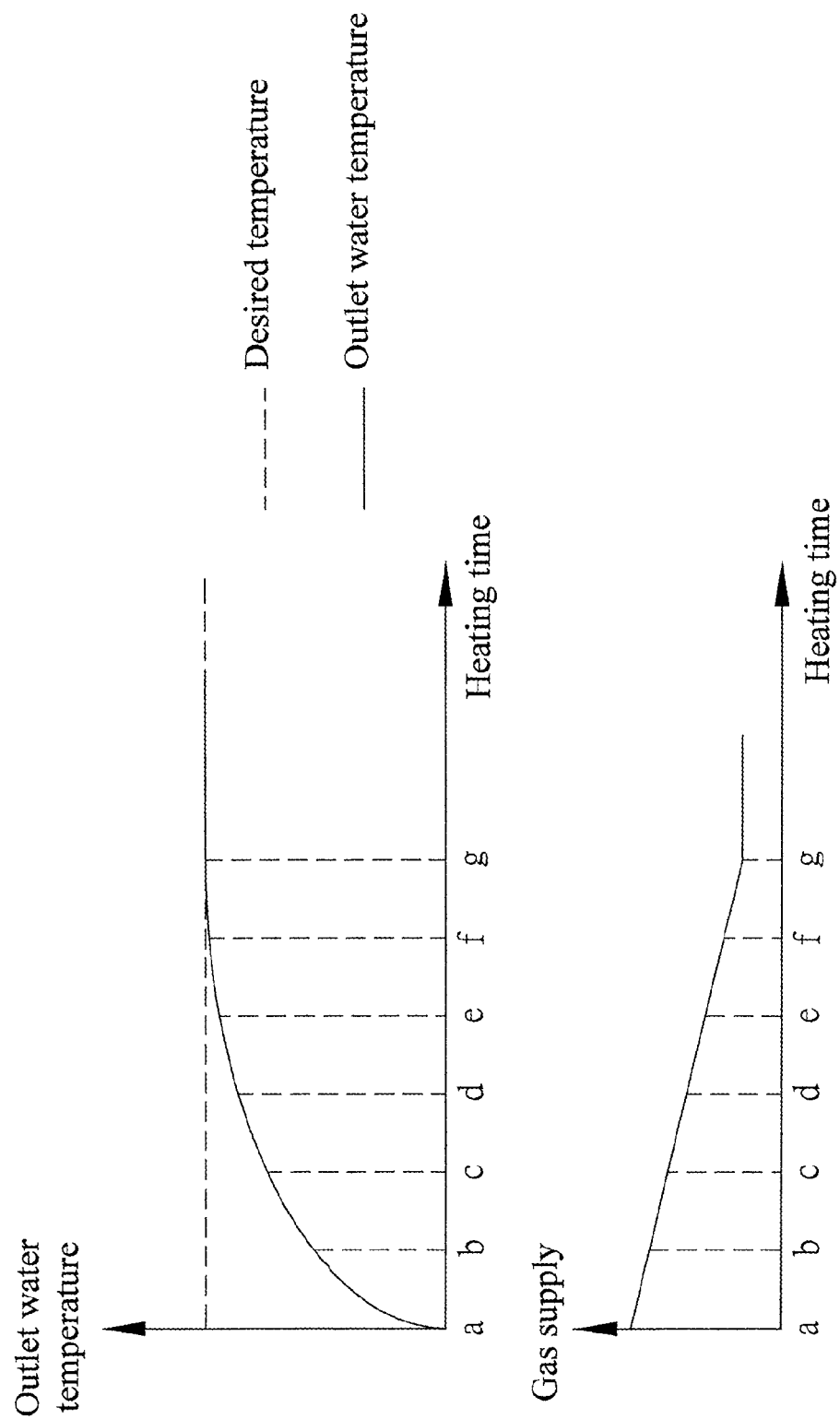
FIG. 8 is a curve diagram of the relationship of the outlet water temperature and the gas supply of the second preferred embodiment of the present invention.

As shown in FIG. 6 and FIG. 7, the second preferred embodiment of the present invention provides a temperature controlling device 140 including a setting controller 141, a gas valve 142, a burner 143, an inlet temperature sensor 144, a water meter 145, and an operational controller 146. The temperature controlling device 140 of the second preferred embodiment further includes an outlet temperature sensor 147 provided at the outlet 112 of the pipe and electrically connected to the operational controller 146. The outlet temperature sensor 147 senses an outlet water temperature and sends a signal to the operational controller 146, and then the operational controller 146 controls the gas valve 142 according to the signal from the outlet temperature sensor 147. The operational controller 146 controls the gas valve 142 to increase the gas supply when a difference between outlet water temperature and the desired temperature is great, and the operational controller 146 controls the gas valve 142 to decrease the gas supply when a difference between outlet water temperature and the desired temperature is little. In other words, the operational controller 146 calculates the total heat for heating water to the desired temperature as described above, and then controls the gas valve 142 to supply gas according to the difference between the outlet water temperature and the desired temperature. In the second preferred embodiment, the gas supply is not consistent like the first preferred embodiment. The gas valve 142 supplies much gas in the beginning because the difference between outlet water temperature and the desired temperature is great, and the gas valve 142 supplies less and less gas when the outlet water temperature is rising, as shown in FIG. 8. It may shorten the time for heating water.

Figure 9:
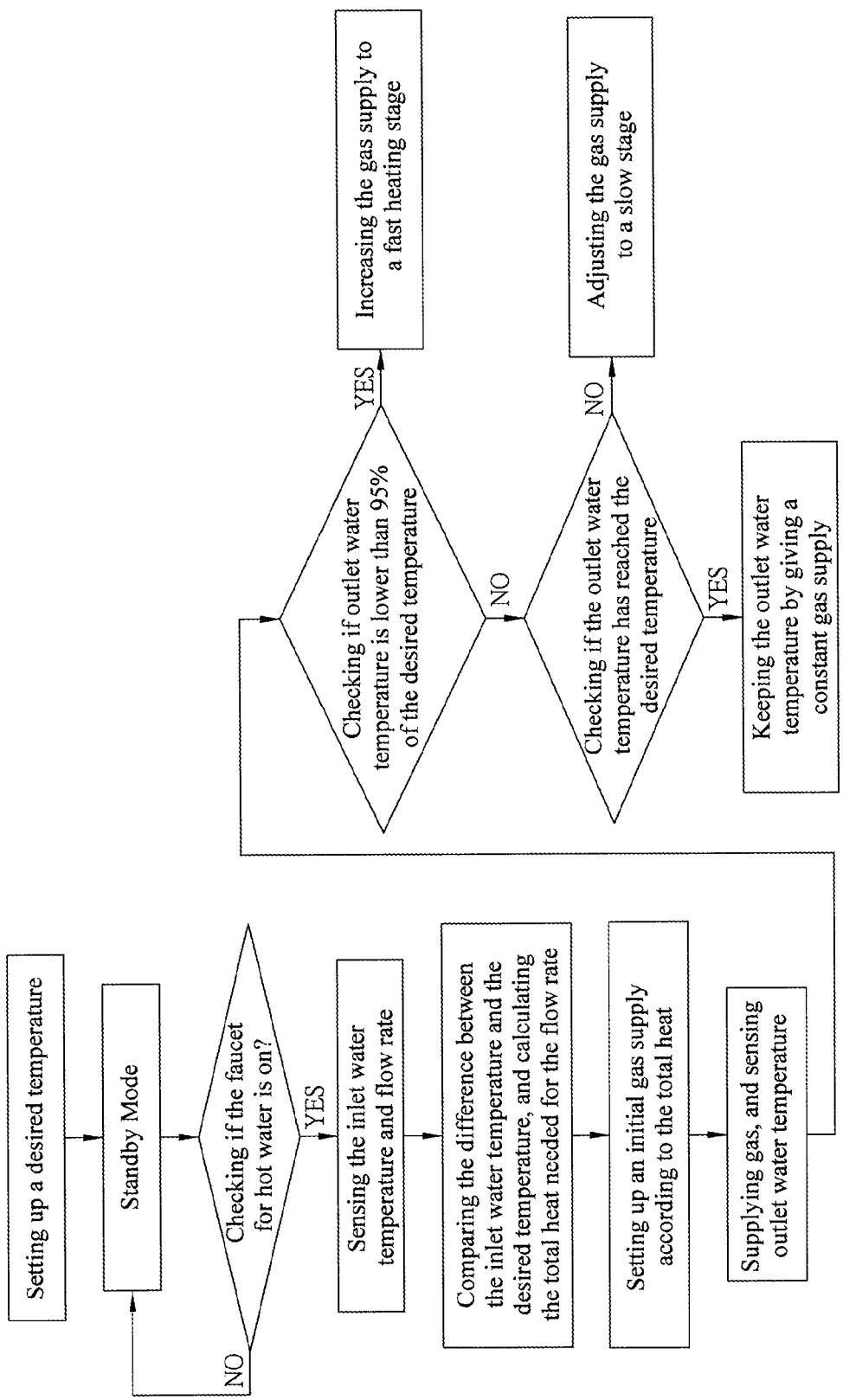
FIG. 9 is a flow chart of the steps of controlling temperature of a third preferred embodiment of the present invention.
Figure 10:
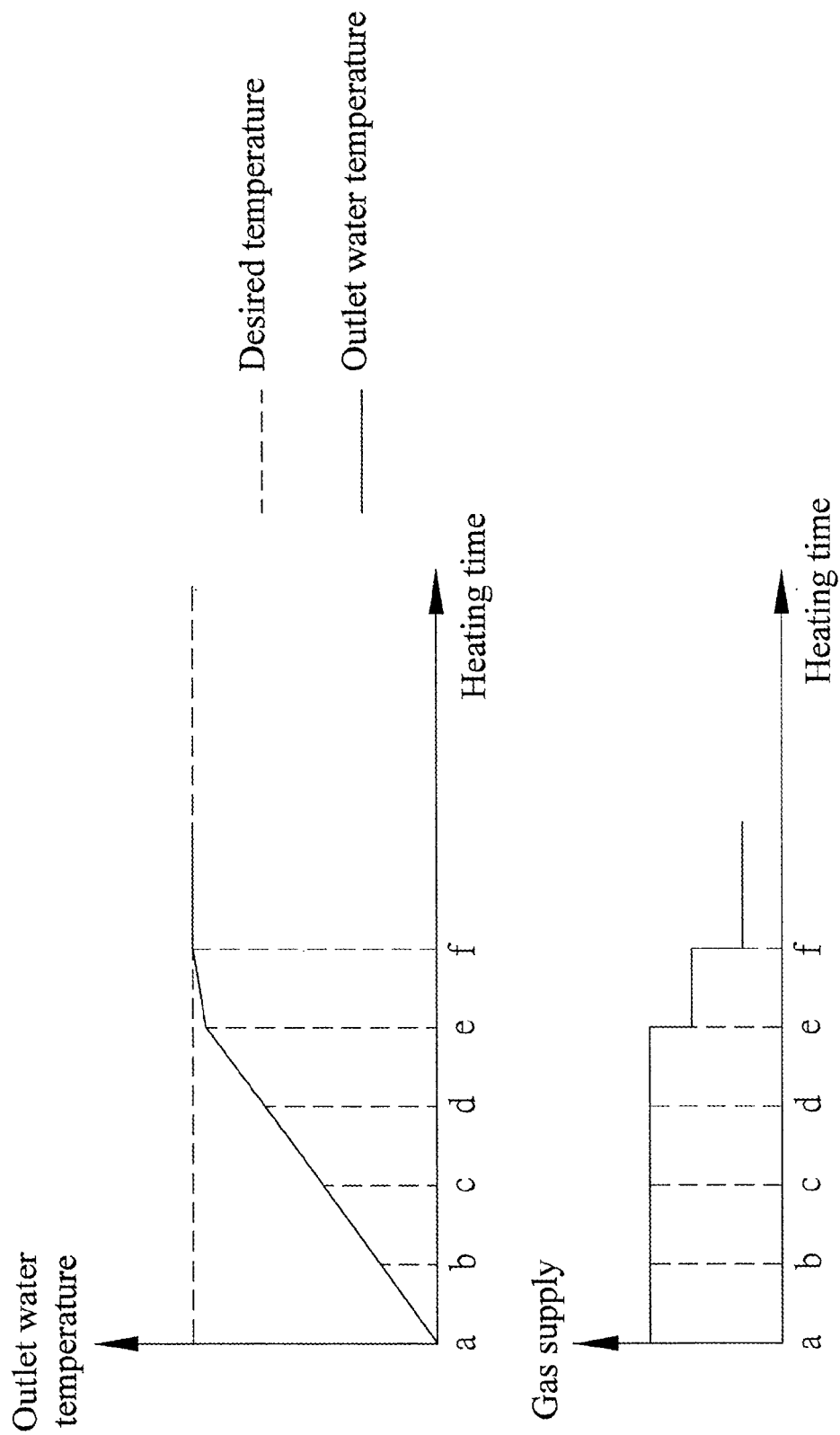
FIG. 10 is a curve diagram of the relationship of the outlet water temperature and the gas supply of the third preferred embodiment of the present invention.

The third preferred embodiment of the present invention provides a two-stage heating mode. As shown in FIG. 9 and FIG. 10, first, the operational controller calculates the total heat for heating water to the desired temperature as described above, and then divides heating into two stages by a ratio of 0.95 to 1 as the outlet water temperature to the desired temperature. When the percentage of the outlet water temperature is lower than 95% of the desired temperature, the heating enters into a fast stage from time (a) to time (e), the operational controller 146 controls the gas valve 142 to supply more gas; and when the percentage of the outlet eater temperature is lower than 95% of the desired temperature, the heating enters into a slow stage from time (e) to time (f), and the operational controller 146 controls the gas valve 142 to supply less gas. In the present embodiment, the gas supply in the fast stage is 1.5 times more than the average gas supply, and the gas supply in the fast stage is identical to the average gas supply. It may shorten the time for heating water. The gas supply per unit of time is constant and greater than zero in both the fast and slow stages.

The description above is a few preferred embodiments of the present invention. These equivalences of the present invention are still in the scope of claim construction of the present invention.

What is claimed is:

1. A method of controlling an outlet water temperature of a water heater, comprising the steps of: setting a desired temperature; sensing an inlet water temperature and a water flow rate; calculating a total heat for heating water from the inlet water temperature to the desired temperature in a predetermined heating time based on the inlet water temperature, the water flow rate, and the desired temperature, while the water flow rate remains the same; calculating a total gas consumption from the total heat, and then dividing the total gas consumption by the predetermined heating; time to obtain a gas supply per unit time; supplying gas to a burner for heating water according to the gas supply per unit time until the gas reaches the total gas consumption; sensing the outlet water temperature; controlling gas supplied to the burner for maintaining the outlet water temperature; and wherein the predetermined heating time is divided into a fast stage and a slow stage where said fast stage is prior to said slow stage where the gas supply per unit time in the fast stage is greater than the gas supply per unit time in the slow stage, and where the gas supply per unit of time is greater than zero; and wherein the gas supply per unit time is constant during the fast stage and during the slow stage; and wherein switching from the fast stare to the slow stare is based on a percentage of the sensed outlet water temperature to the desired temperature.

2. The method as defined in claim 1, wherein the fast stage is determined by the outlet water temperature lower than 95% of the desired temperature.

3. The method as defined in claim 1, wherein the slow stage is determined by the outlet water temperature higher than 95% of the desired temperature.

* * * * *